US011220344B2

(12) United States Patent
Kroeger et al.

(10) Patent No.: US 11,220,344 B2
(45) Date of Patent: Jan. 11, 2022

(54) ANTI-ICE DOUBLE WALLED DUCT SYSTEM

(71) Applicant: ROHR, INC., Chula Vista, CA (US)

(72) Inventors: Daniel Kroeger, San Diego, CA (US); Jihad Ramlaoui, Chula Vista, CA (US); Aleksandar Ratajac, San Diego, CA (US)

(73) Assignee: Rohr, Inc., Chula Visa, CA (US)

( * ) Notice: Subject to any disclaimer, the term of this patent is extended or adjusted under 35 U.S.C. 154(b) by 164 days.

(21) Appl. No.: 16/222,458

(22) Filed: Dec. 17, 2018

(65) Prior Publication Data

US 2020/0189750 A1    Jun. 18, 2020

(51) Int. Cl.
*B64D 15/04* (2006.01)
*B64D 33/02* (2006.01)
*F01D 25/02* (2006.01)
*F02C 7/047* (2006.01)

(52) U.S. Cl.
CPC ............. *B64D 15/04* (2013.01); *B64D 33/02* (2013.01); *F01D 25/02* (2013.01); *F02C 7/047* (2013.01); *B64D 2033/0233* (2013.01); *B64D 2033/0286* (2013.01)

(58) Field of Classification Search
CPC ........... B64D 15/04; B64D 2033/0233; B64D 33/02; B64D 2033/0286; F02C 7/047; F01D 25/02; Y02T 50/60; F05D 2230/642; F05D 2240/55; F05D 2240/90; F05D 2260/60
See application file for complete search history.

(56) References Cited

U.S. PATENT DOCUMENTS

| 4,674,714 A | * | 6/1987 | Cole | B64D 15/04 244/134 B |
| 4,757,963 A | * | 7/1988 | Cole | B64D 15/04 244/134 B |
| 5,011,098 A | | 4/1991 | McLaren et al. | |
| 5,400,984 A | * | 3/1995 | Arnold | B64D 15/04 244/134 B |

(Continued)

FOREIGN PATENT DOCUMENTS

| EP | 1318283 | 6/2003 |
| EP | 2846023 | 3/2015 |

(Continued)

OTHER PUBLICATIONS

European Patent Office, European Search Report dated Mar. 11, 2020 in Application No. 19216495.2.

(Continued)

*Primary Examiner* — Gerald L Sung
*Assistant Examiner* — Rene D Ford
(74) *Attorney, Agent, or Firm* — Snell & Wilmer L.L.P.

(57) ABSTRACT

An anti-icing system is disclosed. In various embodiments, the anti-icing system includes an inner duct having a first end configured to deliver heated gas to a plenum and a second end spaced from the first end; an outer duct circumferentially encompassing at least a portion of the inner duct; and a seal system disposed proximate the second end, the seal system including a first annular seal having a radially inner end positioned proximate a flange disposed on the inner duct.

16 Claims, 6 Drawing Sheets

(56) References Cited

U.S. PATENT DOCUMENTS

| | | | | |
|---|---|---|---|---|
| 6,193,192 | B1* | 2/2001 | Porte | F02C 7/047 244/134 B |
| 6,241,189 | B1* | 6/2001 | Porte | B64D 15/04 244/134 B |
| 7,900,872 | B2* | 3/2011 | Stemberger | B64D 33/02 244/134 C |
| 7,931,235 | B2 | 4/2011 | Zanarelli et al. | |
| 8,678,319 | B2 | 3/2014 | Todorovic | |
| 9,488,067 | B2 | 11/2016 | Johnson et al. | |
| 9,528,442 | B2 | 12/2016 | Trinh et al. | |
| 9,849,992 | B2 | 12/2017 | Goodman et al. | |
| 9,950,799 | B2 | 4/2018 | Anderson et al. | |
| 2002/0148929 | A1* | 10/2002 | Andre | B64D 33/02 244/134 R |
| 2004/0031878 | A1* | 2/2004 | Linton | B64D 15/04 244/10 |
| 2008/0149771 | A1* | 6/2008 | Zanarelli | F02C 7/047 244/134 R |
| 2009/0020647 | A1* | 1/2009 | Porte | B64D 33/02 244/134 B |
| 2009/0314899 | A1* | 12/2009 | Porte | B64D 33/02 244/53 B |
| 2010/0200699 | A1* | 8/2010 | Porte | F02C 7/047 244/134 B |
| 2010/0242428 | A1* | 9/2010 | Vauchel | B64D 33/02 60/39.093 |
| 2011/0011981 | A1* | 1/2011 | Vauchel | B64D 33/02 244/134 B |
| 2012/0255274 | A1* | 10/2012 | Hummel | B64D 15/04 60/39.093 |
| 2014/0263837 | A1* | 9/2014 | Stemberger | B64D 15/04 244/134 B |
| 2015/0176490 | A1* | 6/2015 | Trinh | B64D 15/02 244/134 R |
| 2016/0097323 | A1* | 4/2016 | Prather | F02C 7/047 415/178 |
| 2016/0245174 | A1 | 8/2016 | Lamarre et al. | |
| 2017/0009653 | A1 | 1/2017 | Zheng et al. | |
| 2018/0058322 | A1* | 3/2018 | Alstad | B64D 15/04 |
| 2020/0011243 | A1* | 1/2020 | Chen | B64D 29/00 |

FOREIGN PATENT DOCUMENTS

| | | |
|---|---|---|
| EP | 2846023 | 1/2018 |
| FR | 2961174 | 12/2011 |
| WO | 2014135942 | 9/2014 |

OTHER PUBLICATIONS

European Patent Office, European Office Action dated May 11, 2021 in Application No. 19216495.2.

* cited by examiner

ANTI-ICE DOUBLE WALLED DUCT SYSTEM

FIELD

The present disclosure relates to gas turbine engines and, more particularly, anti-ice systems used in aircraft nacelles that surround gas turbine engines.

BACKGROUND

During operation of an aircraft, atmospheric conditions may lead to the formation of ice on the surfaces of the aircraft. Ice formation on aircraft surfaces, such as on the inlet of a gas turbine engine nacelle, is undesirable and can lead to potentially compromised flying conditions. For example, the formation and accretion of ice on aircraft surfaces may adversely affect the performance of the aircraft by altering the shape of various aerodynamic surfaces of the aircraft. Further, ice accretion on the nacelle inlet surfaces of a gas turbine engine may detach and be drawn through the engine, resulting in the potential for damage to the engine.

To address the above concerns, aircraft may include anti-icing systems to prevent ice formation and accretion on, or to remove ice from, aircraft surfaces. One method of implementing such anti-icing systems is to direct heated gases from the gas turbine engine (e.g., engine bleed air) to interior or exterior surfaces of the aircraft, thereby increasing the temperature of the targeted surfaces. These anti-icing systems may use a double duct configuration to transmit heated gases from the gas turbine engine to the targeted aircraft surface, thereby minimizing the risk of damage to aircraft components (e.g., the acoustic composite structure defining an inner wall of a nacelle inlet) as a result of a ruptured duct. Due to the occurrence of thermal expansion and vibration within the double duct configuration, seal systems are used, for example, to exhaust the heated gases in the event of a ruptured duct and to prevent other fluids, e.g., fuel, hydraulic fluid and water, from entering the double duct configuration.

Preventing fuel, hydraulic fluid or water from entering an annular volume defined by the double duct formation, through use of seals (e.g., tortuous path or labyrinth-type seals), may be beneficial for anti-icing system designs that do not permit natural draining of such fluids, during all phases of flight, due to the location or orientation of such anti-icing system designs within the nacelle. Such features may also be beneficial for designs where attempts to minimize complexity and weight of the anti-icing systems do not permit natural draining of such fluids, which may otherwise result in safety issues.

SUMMARY

An anti-icing system is disclosed. In various embodiments, the anti-icing system includes an inner duct having a first end configured to deliver heated gas to a plenum and a second end spaced from the first end; an outer duct circumferentially encompassing at least a portion of the inner duct; and a seal system disposed proximate the second end, the seal system including a first annular seal having a radially inner end positioned proximate a flange disposed on the inner duct.

In various embodiments, the radially inner end of the first annular seal is configured to flex in an axial direction defined by the first end and the second end of the inner duct. In various embodiments, the radially inner end of the first annular seal is configured to flex in the axial direction between the flange and a supplemental-flange. In various embodiments, a vapor seal is disposed proximate the radially inner end of the first annular seal and configured to contact the flange.

In various embodiments, the first end of the inner duct is configured to extend into a first bulkhead and the second end is configured to extend into a second bulkhead. In various embodiments, the outer duct is configured for connection to the first bulkhead and to the second bulkhead to form a volume between the inner duct and the outer duct and the first bulkhead and the second bulkhead. In various embodiments, a bellows is configured to connect the outer duct to the second bulkhead.

In various embodiments, the radially inner end of the first annular seal includes a seal portion extending in a first axial direction defined by the first end and the second end of the inner duct. In various embodiments, a radially outer end of the flange includes a flange portion extending in a second axial direction defined by the first end and the second end of the inner duct and is configured to create a fluid seal with the seal portion.

In various embodiments, the system includes a vapor seal disposed proximate the radially inner end of the first annular seal. In various embodiments, the vapor seal is configured to contact the flange. In various embodiments, the vapor seal comprises a second annular seal having a radially inner portion configured to contact the flange. In various embodiments, the vapor seal comprises a second annular seal having a radially outer portion configured to contact a bellows.

An anti-icing system for an aircraft nacelle is disclosed. In various embodiments, the system includes an inner duct having a first end configured to deliver heated gas to a plenum defined by a forward bulkhead and an inlet surface and a second end spaced from the first end; an outer duct circumferentially encompassing at least a portion of the inner duct; and a seal system disposed proximate the second end, the seal system including an annular seal having a radially inner end positioned proximate a flange disposed on the inner duct.

In various embodiments, the outer duct is connected to the forward bulkhead and to an aft bulkhead to form a volume between the inner duct and the outer duct and the forward bulkhead and the aft bulkhead. In various embodiments, the radially inner end of the annular seal is configured to flex in an axial direction defined by the first end and the second end of the inner duct. In various embodiments, a vapor seal is disposed proximate the radially inner end of the annular seal. In various embodiments, the vapor seal is configured to contact the flange.

A gas turbine engine is disclosed. In various embodiments, the gas turbine engine includes a nacelle having a forward plenum defined by an inlet surface and a forward bulkhead; a compressor section; a conduit configured to deliver heated gases bled from the compressor section to the forward plenum; and an anti-icing system, comprising: an inner duct having a first end configured to deliver the heated gas to the forward plenum and a second end configured to receive the heated gas from the conduit; an outer duct circumferentially encompassing the inner duct between the forward bulkhead and an aft bulkhead; and a seal system disposed proximate the aft bulkhead, the seal system including an annular seal having a radially inner end positioned proximate a flange disposed on the inner duct. In various embodiments, a vapor seal is disposed proximate the radially inner end of the annular seal and configured to contact the flange.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
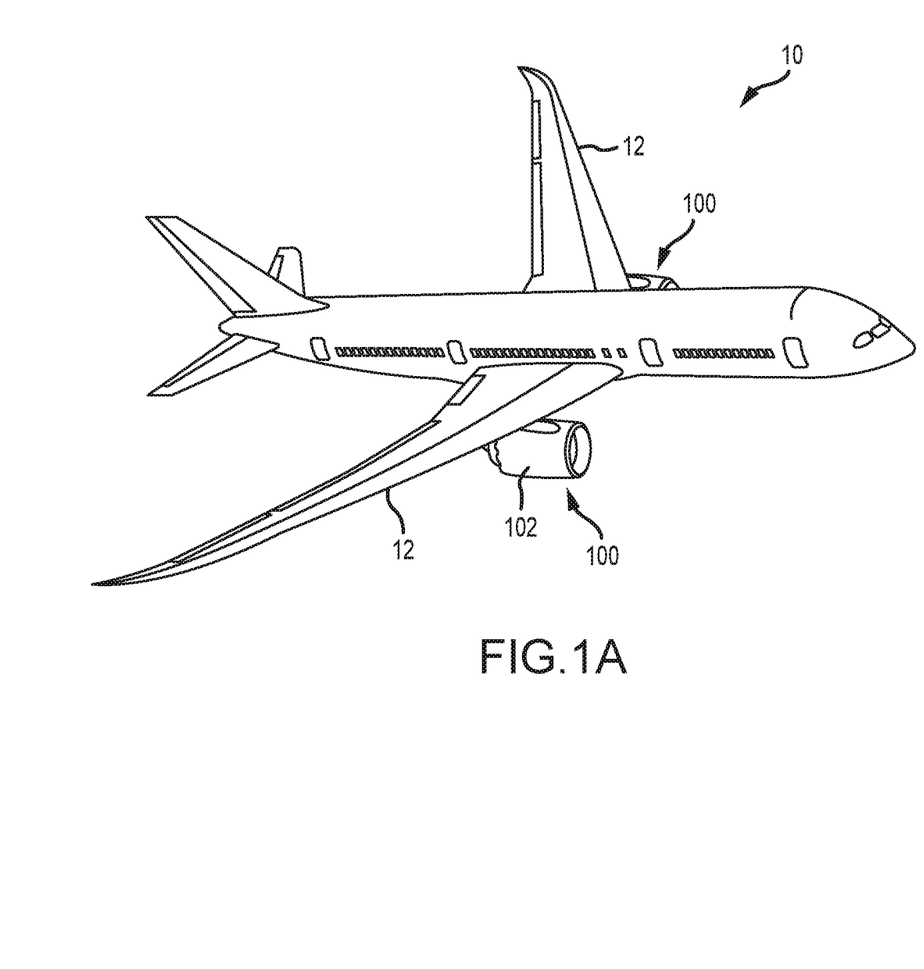
FIG. 1A is a perspective view of an aircraft having a gas turbine engine, in accordance with various embodiments.
Figure 1B:
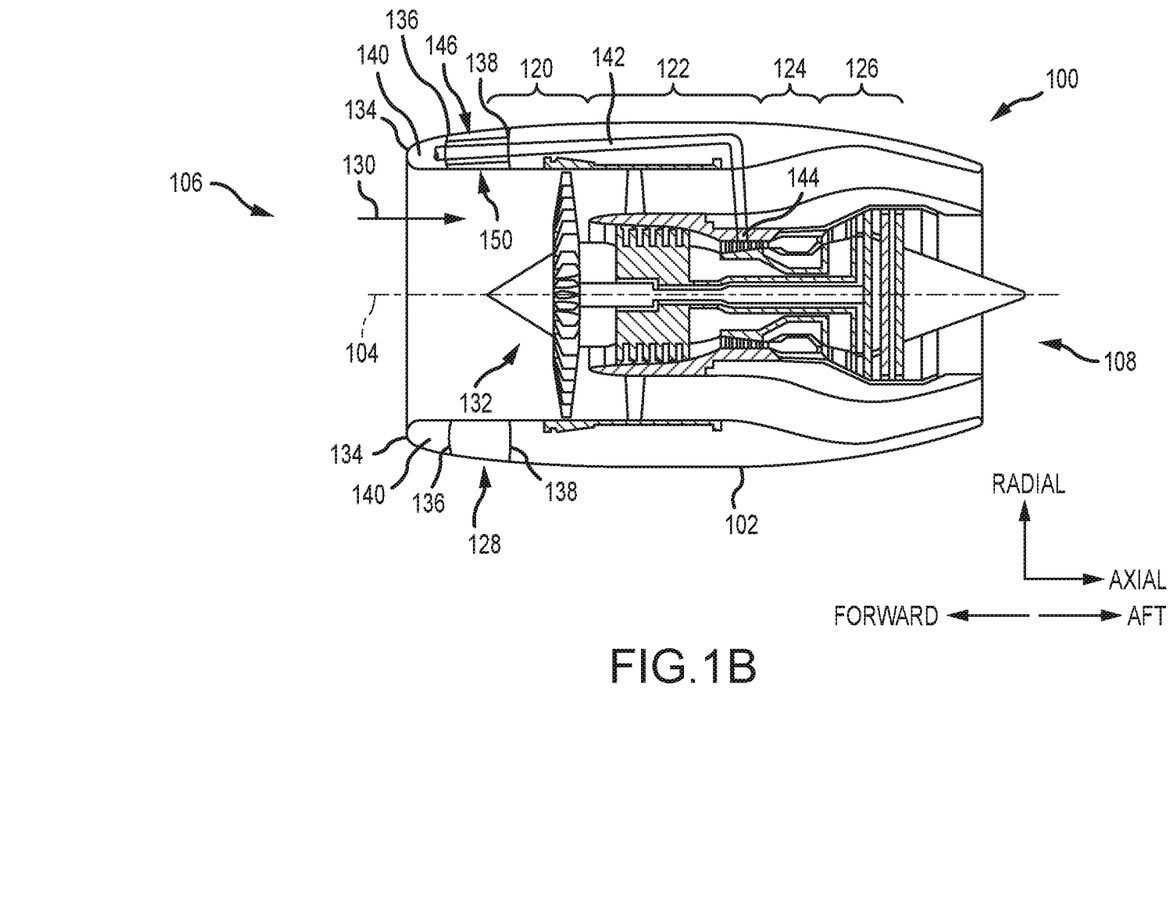
FIG. 1B is a side, cross sectional view of a gas turbine engine, in accordance with various embodiments.

Referring to FIGS. 1A and 1B, an aircraft 10 includes a gas turbine engine 100 mounted to, for example, a wing 12 of the aircraft 10. The gas turbine engine 100 includes a nacelle 102 defining a housing of the gas turbine engine 100 about a longitudinal axis 104. The longitudinal axis 104 extends through the center of the gas turbine engine 100 between a forward end 106 and an aft end 108 of the gas turbine engine 100. The gas turbine engine 100 generally includes a fan section 120, a compressor section 122, a combustor section 124 and a turbine section 126. The nacelle 102 includes an inlet surface 128 for directing an air flow 130 toward the fan section 120 and through an inlet section 132. Because the inlet surface 128 is located at the forward end 106, and therefore not heated directly by the gas turbine engine 100, the inlet surface 128 is prone to the accumulation of ice, especially along a forward lip surface 134 (i.e., the leading edge of the nacelle 102).

In various embodiments, the nacelle 102 includes a forward bulkhead 136 and an aft bulkhead 138, both of which are annularly arranged about the longitudinal axis 104. The inlet surface 128 and the forward bulkhead 136 define a forward plenum 140 for a heated gas to flow and perform the anti-icing function. In various embodiments, the heated gas is directed to the forward plenum 140 via a conduit 142 configured to bleed the heated gas from the compressor section 122. The conduit 142 extends from a tap 144 at the compressor section 122 and extends to a duct system 146 that extends from the aft bulkhead 138 to the forward bulkhead 136. In various embodiments, as described further below, the duct system 146 may comprise a double-walled duct. In various embodiments, an anti-icing system 150 is configured to deliver the heated gas (e.g., hot air bled from the compressor section 122 of the gas turbine engine 100) to the forward plenum 140 to prevent the formation of ice on the forward lip surface 134.

Figure 2A:
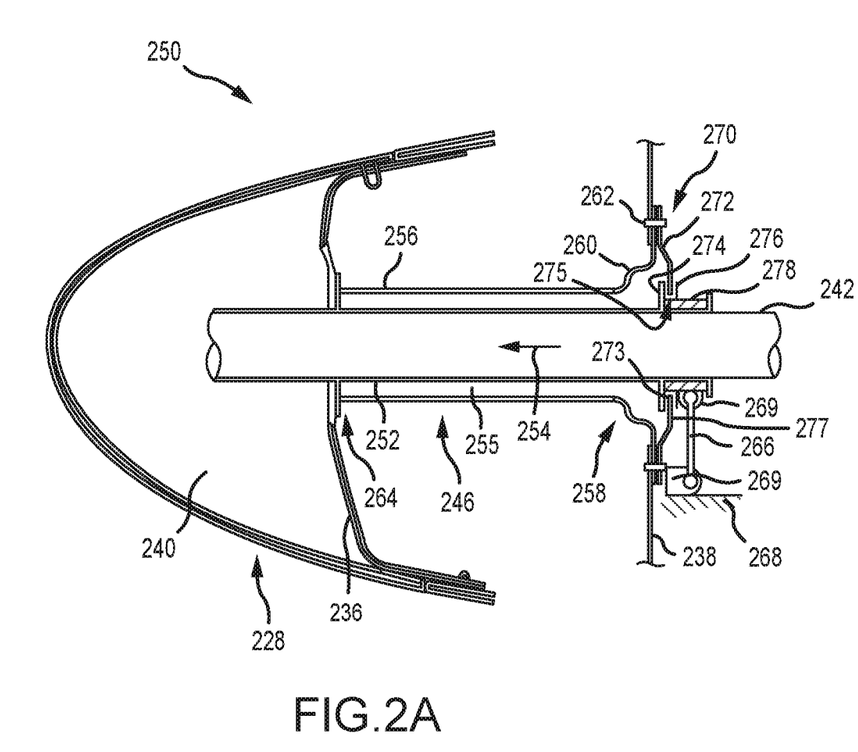
FIGS. 2A, 2B, 2C and 2D illustrate various side and axial views of an anti-icing system, in accordance with various embodiments.
Figure 2B:
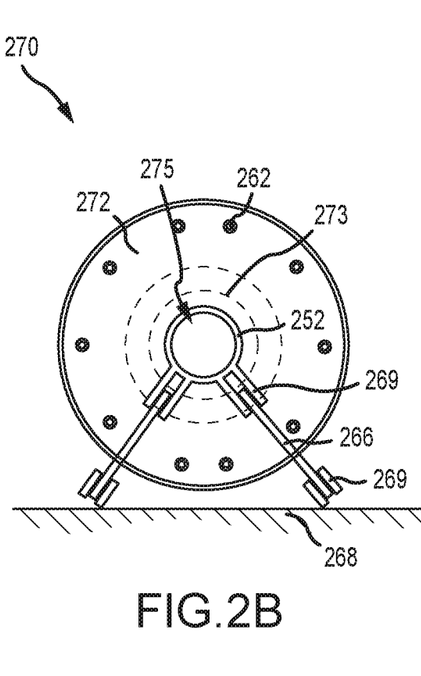

Referring now to FIGS. 2A and 2B, an anti-icing system 250, such as, for example, the anti-icing system 150 described above with reference to FIG. 1B, is illustrated. In various embodiments, the anti-icing system 250 includes a duct system 246 having an inner duct 252 configured to deliver a heated gas 254 from a compressor section, such as, for example, the compressor section 122 described above with reference to FIG. 1B, to a forward plenum 240. Similar to the description above, a forward plenum 240 is defined by an inlet surface 228 and a forward bulkhead 236 (or a first bulkhead). The inner duct 252 extends from the compressor section via a conduit 242 and between the forward bulkhead 236 and an aft bulkhead 238 (or a second bulkhead).

The anti-icing system 250 further includes an outer duct 256 that circumferentially encompasses at least a portion of the inner duct 252. For example, the outer duct 256 may encompass the length of the inner duct 252 between the forward bulkhead 236 and the aft bulkhead 238. This configuration allows the outer duct 256 to contain the heated gas 254 from the compressor section as a result of a rupture occurring within the inner duct 252. The configuration further allows the inner duct 252 to continue directing the heated gas 254 to the forward plenum 240 notwithstanding the rupture occurring within the inner duct 252. In various embodiments, the outer duct 256 may be substantially parallel to the inner duct 252 along the length of the inner duct 252 encompassed by the outer duct 256 (e.g., to form a void between the inner duct 252 and the outer duct 256 while preventing contact between the inner duct 252 and the outer duct 256 due to, for example, vibration or thermal expansion and contraction).

In various embodiments, a first end 258 of the outer duct 256 is mounted to the aft bulkhead 238 by a bellows 260. The bellows 260 forms an annular seal between the aft bulkhead 238 and the outer duct 256. In various embodiments, the bellows 260 may be welded to one or both of the aft bulkhead 238 and the outer duct 256 about the circumference of the bellows 260. The bellows 260 may also be secured to one or both of the aft bulkhead 238 and the outer duct 256 using a plurality of rivets 262 or the like disposed about a radially outer circumference of the bellows 260. The bellows 260 may be configured to accommodate vibration, lateral deflection, and thermal expansion and contraction of the outer duct 256 and one or both of the forward bulkhead 236 and the aft bulkhead 238. In various embodiments, the bellows 260 may be constructed of Inconel, titanium, or any other material suitable for high-temperature or high-pressure applications. In various embodiments, a second end 264 of the outer duct 256 is mounted to the forward bulkhead 236. In such a configuration, the inner duct 252, the outer duct 256 and the bellows 260 may form an enclosed annular void between the forward bulkhead 236 and the aft bulkhead 238.

Still referring to FIGS. 2A and 2B, in various embodiments, the anti-icing system 250 includes at least one link 266 configured to support the inner duct 252. The at least one link 266 is configured to couple the inner duct 252 to a fixed structure 268 of the gas turbine engine. The fixed structure 268 may comprise, for example, an attachment ring extending circumferentially about the gas turbine engine. For example, the at least one link 266 may be mounted between the inner duct 252 and the fixed structure 268 using mounts 269 disposed on an aft side of the aft bulkhead 238. The mounts securing the at least one link 266 to the fixed structure 268 and the inner duct 252 may be oriented in any suitable direction (e.g., axially, radially, etc.). The mounts 269 may be configured to permit relative motion between the inner duct 252 and the fixed structure 268. The at least one link 266 may comprise any number of links (e.g., 1, 2, 3, or more links) necessary to support the inner duct 252. Additionally, the at least one link 266 may be used independently or in combination with the bellows 260.

The at least one link 266 may support or allow movement of the inner duct 252 in one or more of a radial, lateral, or axial direction. Such movement may facilitate leakage of fluids from locations aft of the aft bulkhead to enter a volume 255 between the inner duct 252 and the outer duct 256. Accordingly, a seal system 270 is incorporated into the anti-icing system 250. In various embodiments, the seal system 270 is multi-functional in that it allows the heated gas 254 to escape the volume 255 between the inner duct 252 and the outer duct 256 in the event of a rupture occurring within the inner duct 252 and it also prevents the flow of fluids—e.g., fuel, hydraulic fluid or water—from entering the volume 255 between the inner duct 252 and the outer duct 256 from locations aft of the aft bulkhead 238.

In various embodiments, the seal system 270 is disposed aft of the aft bulkhead 238 and includes an annular seal 272 (e.g., a labyrinth seal) that includes an opening 275 that defines a radially inner edge 273 and a radially inner end or portion 277 configured to contact a flange 274 (or be disposed in close proximity to the flange 274) that is affixed to the inner duct 252. Contact or near contact between the annular seal 272 and the flange 274 creates a restriction that prevents (or restricts) fluids—e.g., fuel, hydraulic fluid or water—existing aft of the aft bulkhead from entering the volume 255 between the inner duct 252 and the outer duct 256 from locations aft of the aft bulkhead 238. This aspect of the seal system 270 is beneficial in that flammable liquids are prevented from entering the volume 255 and being ignited due to the temperature of the inner duct 252. This aspect of the seal system 270 is also beneficial in that corrosion of the inner duct 252, the outer duct 256 or the bellows 260 due to the presence of water may be minimized or eliminated. On the other hand, the annular seal 272 may be characterized as having a degree of flexibility that permits the radially inner edge 273 to be forced aft of the flange 274 by the heated gas 254 in the event of a rupture of the inner duct 252. This aspect of the seal system 270 is beneficial in that an exhaust mechanism is provided to allow the heated gas 254 to escape the volume 255 between the inner duct 252 and the outer duct 256 in the event of a rupture.

In various embodiments, the seal system 270 may include a supplemental-flange 276 to prevent fluid egress with the radial inner edge 273 of the annular seal 272 in the event of a rupture. In various embodiments, an insulator 278 may extend about the inner duct 252 to shield the annular seal 272 from thermal loads developed by the heated gas 254 passing through the inner duct 252. As with the bellows 260 described above, in various embodiments, the annular seal 272 may be welded to the aft bulkhead 238 or otherwise secured to the aft bulkhead 238 using a plurality of rivets 262 or the like disposed about the radially outer circumference of the annular seal 272. The annular seal 272 may be configured to accommodate vibration, lateral deflection, and thermal expansion and contraction of the inner duct 252 and the outer duct 256 and still maintain a proper seal. In various embodiments, the annular seal 272 may be constructed of Inconel, titanium, or any other material suitable for high-temperature or high-pressure applications.

Figure 2C:
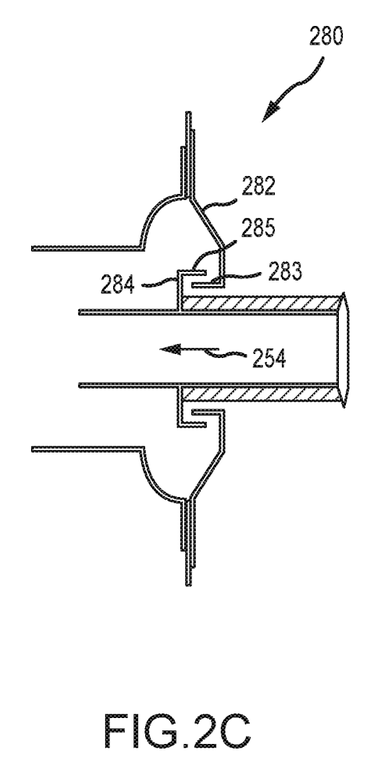
Figure 2D:
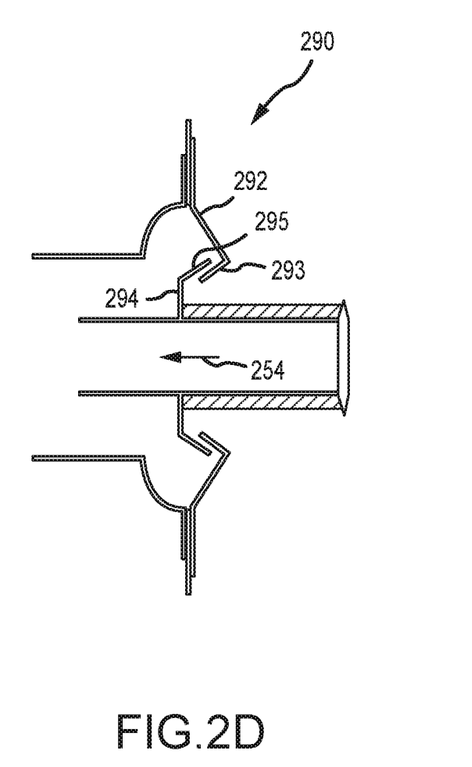

Referring now to FIGS. 2C and 2D, additional embodiments of a seal system are illustrated. For example, referring to FIG. 2C, a seal system 280 includes an annular seal 282 (e.g., a labyrinth seal) and a flange 284. As illustrated, the annular seal 282 includes a radially inner edge 283 (or radially inner end or portion) that is oriented in a substantially forward direction (e.g., a first axial direction to establish a seal portion of a seal) and configured to create a fluid seal with a radially outer end 285 of the flange 284 that extends in a substantially aft direction (e.g., a second axial direction to establish a flange portion of the seal). Referring to FIG. 2D, a seal system 290 includes an annular seal 292 (e.g., a labyrinth seal) and a flange 294. As illustrated, the annular seal 292 includes a radially inner edge 293 (or radially inner end or portion) that is oriented in a substantially forward and radially inward direction (to establish a seal portion of the seal) and configured to create a fluid seal with a radially outer end 295 of the flange 294 that extends in a substantially aft and radially outward direction (to establish a flange portion of the seal). All other constructional and operational aspects of the fluid seal systems illustrated in FIGS. 2C and 2D are essentially identical to those described above with reference to FIGS. 2A and 2B and so are not repeated here.

Figure 3A:
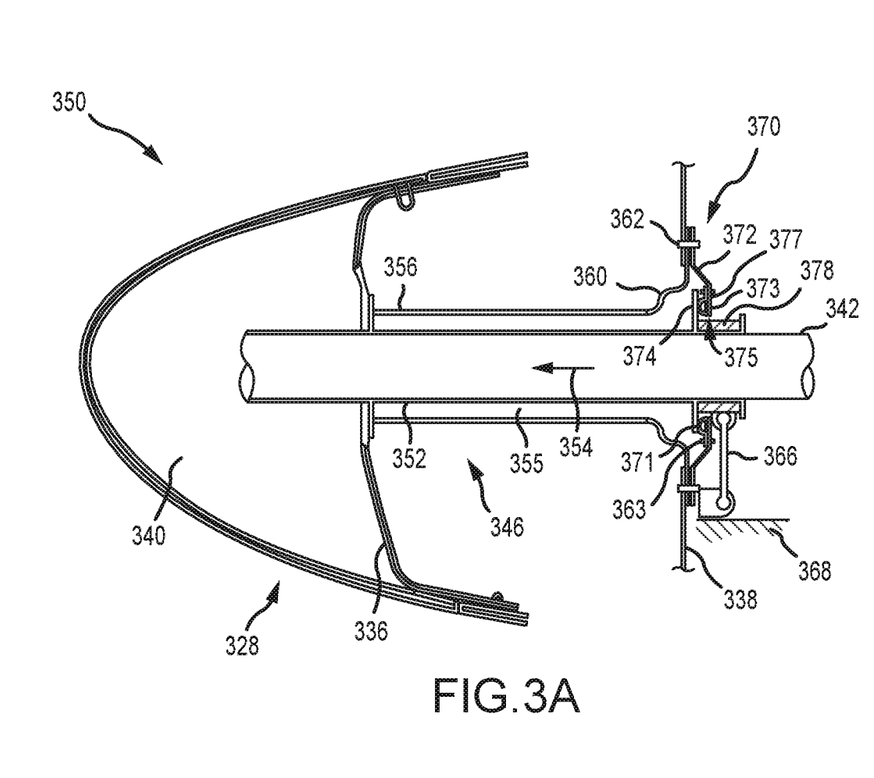
FIGS. 3A, 3B, 3C and 3D illustrate various side and axial views of an anti-icing system, in accordance with various embodiments.
Figure 3B:
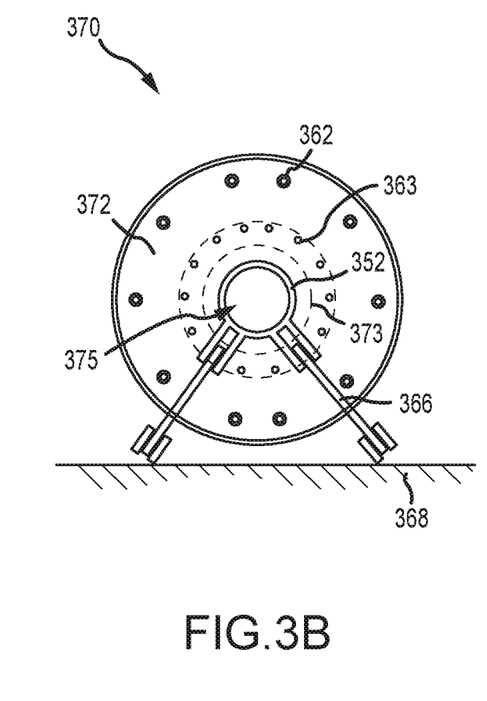

Referring now to FIGS. 3A and 3B, an anti-icing system 350, such as, for example, the anti-icing system 150 described above with reference to FIG. 1B, is illustrated. In various embodiments, the anti-icing system 350 includes many of the components and shares many of the features of the anti-icing system 250 described above with reference to FIGS. 2A and 2B. For the sake of brevity, like numerals are used to identify the various features sharing common construction and features and the accompanying description is shortened where appropriate. A duct system 346 includes an inner duct 352 configured to deliver a heated gas 354 from a compressor section to a forward plenum 340 defined by an inlet surface 328 and a forward bulkhead 336. The inner duct 352 extends from the compressor section via a conduit 342 and between the forward bulkhead 336 and an aft bulkhead 338. The anti-icing system 350 further includes an outer duct 356 that circumferentially encompasses at least a portion of the inner duct 352 between the forward bulkhead 336 and an aft bulkhead 338.

In various embodiments, a bellows 360 forms an annular seal between the aft bulkhead 338 and the outer duct 356. The bellows 360 may be configured to accommodate vibration, lateral deflection, and thermal expansion and contraction of the outer duct 356 and one or both of the forward bulkhead 336 and the aft bulkhead 338. In various embodiments, the bellows 360 may be constructed of Inconel, titanium, or any other material suitable for high-temperature or high-pressure applications. In various embodiments, the inner duct 352, the outer duct 356 and the bellows 360 form an enclosed annular void between the forward bulkhead 336 and the aft bulkhead 338.

Still referring to FIGS. 3A and 3B, in various embodiments, the anti-icing system 350 includes at least one link 366 configured to support the inner duct 352. The at least one link 366 is configured to couple the inner duct 352 to a fixed structure 368 of the gas turbine engine. The at least one link 366 may support or allow movement of the inner duct 352 in one or more of a radial, lateral, or axial direction. Such movement may facilitate leakage of fluids from locations aft of the aft bulkhead to enter a volume 355 between the inner duct 352 and the outer duct 356. In addition, such movement may allow vapors to enter the volume 355. Accordingly, a seal system 370 is incorporated into the anti-icing system 350. In various embodiments, the seal system 370 is multi-functional in that it allows the heated gas 354 to escape the volume 355 between the inner duct 352 and the outer duct 356 in the event of a rupture occurring within the inner duct 352 and it also prevents the flow of vapors (e.g., water vapor or vaporized fuel) in addition to the flow of fluids (e.g., fuel, hydraulic fluid or water) from entering the volume 355 between the inner duct 352 and the outer duct 356 from locations aft of the aft bulkhead 338.

In various embodiments, the seal system 370 is disposed aft of the aft bulkhead 338 and includes an annular seal 372 (e.g., a labyrinth seal) that includes an opening 375 that defines a radially inner edge 373 and a radially inner end or portion 377 and a vapor seal 371. The vapor seal 371 is disposed at the radially inner edge 373 of the annular seal 372 and makes contact with a flange 374 that is affixed to the inner duct 352. In various embodiments, the annular seal 372 may be configured to position the vapor seal 371 into contact with the flange 374, thereby creating a restriction that prevents (or restricts) vapors (e.g., water vapor or vaporized fuel) and fluids (e.g., fuel, hydraulic fluid or water) existing aft of the aft bulkhead from entering the volume 355 between the inner duct 352 and the outer duct 356 from locations aft of the aft bulkhead 338. Similar to the description above, this aspect of the seal system 370 is beneficial in that flammable vapors and liquids are prevented from entering the volume 355 and being ignited due to the temperature of the inner duct 352. This aspect of the seal system 370 is also beneficial in that corrosion of the inner duct 352, the outer duct 356 or the bellows 360 due to the presence of water or water vapor may be minimized or eliminated. On the other hand, the annular seal 372 may be characterized as having a degree of flexibility that permits the radially inner edge 373 (and the vapor seal 371) to be forced aft of the flange 374 by the heated gas 354 in the event of a rupture of the inner duct 352. This aspect of the seal system 370 is beneficial in that an exhaust mechanism is provided to allow the heated gas 354 to escape the volume 355 in the event of a rupture.

In various embodiments, an insulator 378 may extend about the inner duct 352 to shield the annular seal 372 from thermal loads developed by the heated gas 354 passing through the inner duct 352. In various embodiments, either or both of the bellows 360 and the annular seal 372 may be welded to the aft bulkhead 338 or otherwise secured to the aft bulkhead 338 using a plurality of rivets 362 or the like disposed about a radially outer circumference of the annular seal 372. Similarly, the vapor seal 371 may be secured to the radially inner edge 373 of the annular seal 372 using a second plurality of rivets 363 or the like disposed about a radially inner circumference of the annular seal 372. The annular seal 372 may be configured to accommodate vibration, lateral deflection, and thermal expansion and contraction of the inner duct 352 and the outer duct 356 and still maintain a proper seal. In various embodiments, the annular seal 372 may be constructed of Inconel, titanium, or any other material suitable for high-temperature or high-pressure applications.

Figure 3C:
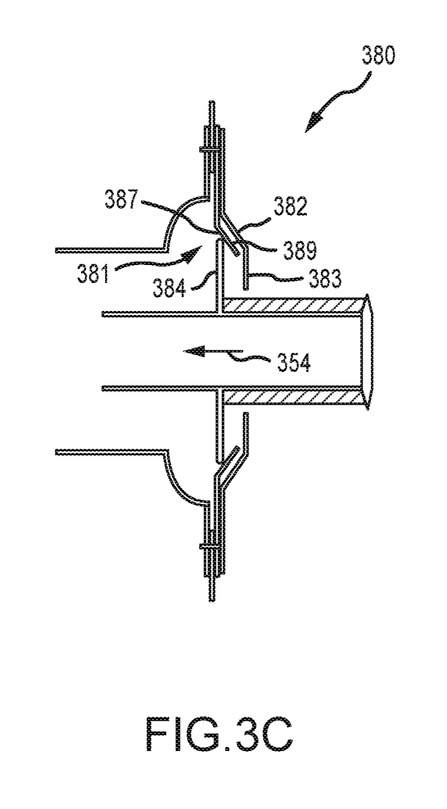
Figure 3D:
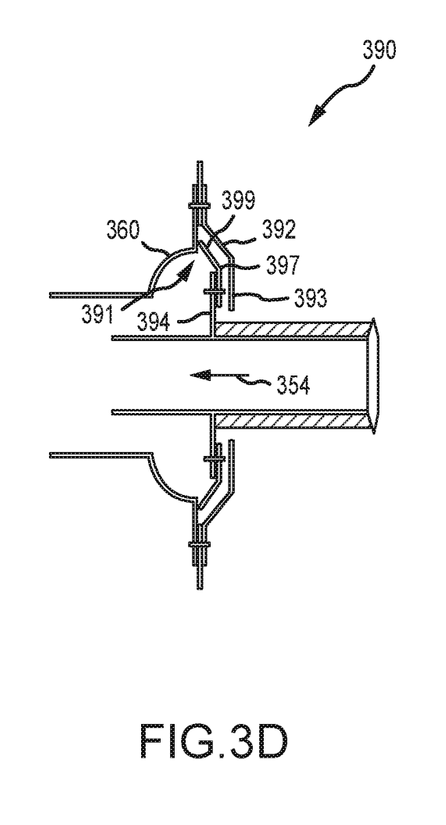

Referring now to FIGS. 3C and 3D, additional embodiments of a seal system are illustrated. For example, referring to FIG. 3C, a seal system 380 includes an annular seal 382 (or first annular seal) and a flange 384. As illustrated, the annular seal 382 includes a radially inner edge 383 (or radially inner end or portion) that is oriented in a substantially radially inward direction and configured to create a fluid seal similar to the fluid seal created by the annular seal 272 described above with reference to FIGS. 2A and 2B. The seal system 380 further includes a second annular seal 387 having a radially inner portion 389 that extends in a substantially aft and radially inward direction to form a vapor seal 381 through contact with the flange 384. Referring to FIG. 3D, a seal system 390 includes an annular seal 392 (or first annular seal) and a flange 394. As illustrated, the annular seal 392 includes a radially inner edge 393 (or radially inner end or portion) that is oriented in a substantially radially inward direction and configured to create a fluid seal similar to the fluid seal created by the annular seal 272 described above with reference to FIGS. 2A and 2B. The seal system 390 further includes a second annular seal 397 having a radially outer portion 399 that extends in a substantially forward and radially outward direction to form a vapor seal 391 through contact with a bellows 360. All other constructional and operational aspects of the fluid seal systems illustrated in FIGS. 3C and 3D are essentially identical to those described above with reference to FIGS. 3A and 3B and so are not repeated here.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An anti-icing system, comprising:
   an inner duct having a first end configured to deliver heated gas to a plenum and a second end spaced from the first end;
   an outer duct circumferentially encompassing at least a portion of the inner duct; and
   a seal system disposed proximate the second end, the seal system including a first annular seal having a radially inner end positioned proximate a flange disposed on the inner duct,
      wherein the first end of the inner duct is configured to extend into a first bulkhead and the second end is configured to extend into a second bulkhead,
      wherein the outer duct is configured for connection to the first bulkhead and to the second bulkhead to form a volume between the inner duct and the outer duct and the first bulkhead and the second bulkhead and
      wherein the anti-icing system further comprises a bellows configured to connect the outer duct to the second bulkhead.

2. The anti-icing system of claim 1, wherein the radially inner end of the first annular seal is configured to flex in an axial direction defined by the first end and the second end of the inner duct.

3. The anti-icing system of claim 2, wherein the radially inner end of the first annular seal is configured to flex in the axial direction between the flange and a supplemental-flange.

4. The anti-icing system of claim 2, further comprising a vapor seal disposed proximate the radially inner end of the first annular seal and configured to contact the flange.

5. The anti-icing system of claim 1, wherein the radially inner end of the first annular seal includes a seal portion extending in a first axial direction defined by the first end and the second end of the inner duct.

6. The anti-icing system of claim 5, wherein a radially outer end of the flange includes a flange portion extending in a second axial direction defined by the first end and the second end of the inner duct and is configured to create a fluid seal with the seal portion.

7. The anti-icing system of claim 1, further comprising a vapor seal disposed proximate the radially inner end of the first annular seal.

8. The anti-icing system of claim 7, wherein the vapor seal is configured to contact the flange.

9. The anti-icing system of claim 8, wherein the vapor seal comprises a second annular seal having a radially inner portion configured to contact the flange.

10. The anti-icing system of claim 8, wherein the vapor seal comprises a second annular seal having a radially outer portion configured to contact the bellows.

11. An anti-icing system for an aircraft nacelle, comprising:
    an inner duct having a first end configured to deliver heated gas to a plenum defined by a forward bulkhead and an inlet surface and a second end spaced from the first end;
    an outer duct circumferentially encompassing at least a portion of the inner duct; and
    a seal system disposed proximate the second end, the seal system including an annular seal having a radially inner end positioned proximate a flange disposed on the inner duct,
       wherein the first end of the inner duct is configured to extend into the forward bulkhead and the second end is configured to extend into an aft bulkhead,
       wherein the outer duct is configured for connection to the forward bulkhead and to the aft bulkhead to form a volume between the inner duct and the outer duct and the forward bulkhead and the aft bulkhead and
       wherein the anti-icing system further comprises a bellows configured to connect the outer duct to the aft bulkhead.

12. The anti-icing system of claim 11, wherein the radially inner end of the annular seal is configured to flex in an axial direction defined by the first end and the second end of the inner duct.

13. The anti-icing system of claim 12, further comprising a vapor seal disposed proximate the radially inner end of the annular seal.

14. The anti-icing system of claim 13, wherein the vapor seal is configured to contact the flange.

15. A gas turbine engine, comprising:
    a nacelle having a forward plenum defined by an inlet surface and a forward bulkhead;
    a compressor section;
    a conduit configured to deliver a heated gas bled from the compressor section to the forward plenum; and
    an anti-icing system, comprising:
       an inner duct having a first end configured to deliver the heated gas to the forward plenum and a second end configured to receive the heated gas from the conduit;
       an outer duct circumferentially encompassing the inner duct between the forward bulkhead and an aft bulkhead; and
       a seal system disposed proximate the aft bulkhead, the seal system including an annular seal having a radially inner end positioned proximate a flange disposed on the inner duct, wherein the first end of the inner duct is configured to extend into the forward bulkhead and the second end is configured to extend into the aft bulkhead, wherein the outer duct is configured for connection to the forward bulkhead and to the aft bulkhead to form a volume between the inner duct and the outer duct and the forward bulkhead and the aft bulkhead and wherein the anti-icing system further comprises a bellows configured to connect the outer duct to the aft bulkhead.

16. The gas turbine engine of claim 15, further comprising a vapor seal disposed proximate the radially inner end of the annular seal and configured to contact the flange.

* * * * *